United States Patent Office 3,480,080
Patented Nov. 25, 1969

3,480,080
WATERFLOODING WITH AN AQUEOUS, SALINE SOLUTION OF A HYDROCARBON SULFONATE HAVING AN OPTIMUM DEGREE OF SULFONATION
Charles L. Murphy, Dallas, Tex., assignor to Mobil Oil Corporation, a corporation of New York
No Drawing. Filed Mar. 22, 1968, Ser. No. 715,135
Int. Cl. E21b 47/00; E21c 43/22
U.S. Cl. 166—252                         9 Claims

ABSTRACT OF THE DISCLOSURE

This specification discloses waterflooding to recover oil from a subterranean oil-containing formation employing a saline solution of a hydrocarbon sulfonate wherein the degree of sulfonation of the hydrocarbon sulfonate which effects the lowest interfacial tension between the solution of the sulfonate and the oil in the formation is empirically determined. A plurality of solutions having the same given ionic strength but containing a hydrocarbon sulfonate having different degrees of sulfonation are placed in contact with oil from the formation, and the interfacial tensions between the solutions and the oils are measured. The hydrocarbon sulfonate having the degree of sulfonation effecting the lowest interfacial tension is then employed in an aqueous solution thereof having the given ionic strength for flooding the formation to recover oil from the formation.

Background of the invention

This invention relates to a method for effecting a minimum interfacial tension between an aqueous, saline solution of a hydrocarbon sulfonate and an oil for recovery of the oil from a subterranean formation by a flooding operation.

Oil may be recovered from a subterranean oil-containing formation by a process called "waterflooding." In this type of operation, water is injected into the subterranean formation through one or more injection wells leading to the formation from the surface of the earth. The water injected into the formation displaces the oil in the formation and moves it through the formation in the direction of one or more production wells leading from the formation to the surface of the earth. The oil can then be recovered from the production well or wells.

In the waterflooding operation, the lower the interfacial tension between the water employed in the flooding operation and the oil in the formation, the greater will be the extent to which the oil is removed from those portions of the formation through which the flooding water passes. Commonly, the interfacial tension between the flooding water and the oil contained in the subterranean formation is lowered by adding a surfactant to the flooding water. A surfactant proposed for such use is a hydrocarbon sulfonate. With a flooding water containing a hydrocarbon sulfonate, the interfacial tension is further lowered where the flooding water is saline, i.e., contains sodium chloride and has a finite ionic strength. However, the sodium chloride content is preferably not more than 5 percent by weight of the water since higher concentrations of sodium chloride are incompatible with hydrocarbon sulfonates.

Hydrocarbon sulfonates are prepared by subjecting the hydrocarbon to the action of a suitable sulfonating agent. The hydrocarbon ordinarily is not a single hydrocarbon but is a mixture of hydrocarbons of different molecular weights. Such mixtures can be characterized on the basis of the average molecular weight of their aromatic fraction. Further, the degree of sulfonation of the hydrocarbon may vary depending upon the sulfonating conditions. By "degree of sulfonation" is meant the number of $SO_3H$ groups, on the average, which have been substituted for hydrogen on the molecule of the hydrocarbon.

Waterflooding operations employing hydrocarbon sulfonates as the surfactant require large quantities of the hydrocarbon sulfonates. These quantities of the hydrocarbon sulfonates are not ordinarily readily available on the market and must be specially ordered and prepared. Moreover, these quantities may be so large that the supply of any given hydrocarbon from which the hydrocarbon sulfonates may be prepared, and be obtained at a cost which is economically practical from the standpoint of a waterflooding operation, is insufficient to meet the required demand. In such instances, the hydrocarbon sulfonates, to be obtained at an economically practical cost, cannot be prepared from hydrocarbons which otherwise might be desirable but must be prepared from those hydrocarbons which are available.

The flooding water to be employed in a waterflooding operation for the recovery of oil is ordinarily limited also by practical considerations to the water that is available. This water, as stated, should contain sodium chloride in order to reduce further the interfacial tension. However, as also stated, it cannot contain more than 5 percent by weight of sodium chloride. The available waters are oil field brines, i.e., water separated from oil that is produced from a subterranean formation along with the oil, or are ground waters. These waters contain sodium chloride along with lesser quantities of other salts. Some of these contain more than 5 percent by weight of sodium chloride and must be diluted with fresher water to reduce the concentration of sodium chloride. However, treatment to reduce or increase the saline content, or ionic strength, of these waters adds to the cost of the waterflooding operation and ordinarily is avoided or kept to a minimum.

Summary of the invention

My invention is based upon the discovery that, for an aqueous solution of given ionic strength containing a sulfonate prepared from a given hydrocarbon as a surfactant, there is a degree of sulfonation of the hydrocarbon which will effect a minimum interfacial tension between the aqueous solution and a hydrocarbon phase.

In carrying out the invention, a plurality of aqueous solutions having the same ionic strength are prepared. The interfacial tension between these solutions containing the same quantity, on a molar basis, of sulfonates of the same hydrocarbon, each of these sulfonates having a different degree of sulfonation, and an oil, the oil being the same for each solution, is measured. The degree of sulfonation effecting the lowest interfacial tension is determined from these measurements. Thereafter, the hydrocarbon sulfonate having the degree of sulfonation effecting the lowest interfacial tension is employed in an aqueous solution thereof having the same ionic strength in a waterflooding operation.

Description of the preferred embodiments

In the preferred embodiment of the invention, a sample of oil is taken from a subterranean formation which is to be subjected to waterflooding for recovery of the oil. A sample of the saline water available for use in flooding the subterranean formation and containing less than 5 percent by weight of sodium chloride is also taken. To aliquots of the sample of water are added equal amounts of sulfonates of a hydrocarbon. This hydrocarbon is one which is available for sulfonation to provide the surfactant for use in the waterflooding operation. These sulfonates are of the same hydrocarbon but differ from each other in the degree to which the hydrocarbon has been sulfonated. The aliquots of the sample of water are placed in contact with aliquots of the sample of oil and the interfacial tension between the water and the oil is measured to determine the degree of sulfonation effecting the lowest interfacial tension. Thereafter, flooding water is made up by mixing the available water with the sulfonate prepared from the available hydrocarbon and having the degree of sulfonation effecting the lowest interfacial tension. The flooding water is then injected into the subterranean formation for recovery of oil contained in the formation.

The sample of the oil may be obtained from the formation by any suitable means. For example, a core sample may be taken from the formation and the oil extracted from the core sample. Extraction can be effected by subjecting the core sample to the action of a solvent and the solvent thereafter removed from its solution with the oil. However, solvent extraction may change the characteristics of the oil from those in its native state and the degree of sulfonation determined to be optimum for this oil may not be the same degree of sulfonation optimum for the oil in its native state. Preferably, the oil is obtained, where this is possible, by removing liquid oil accumulating at the bottom of a well leading from the formation. If necessary, suction may be applied to the well to assist in causing oil to flow from the formation and accumulate at the bottom of the well.

The sample of the available water should be that of the water as it will be injected into the subterranean formation. For example, if the water is to be filtered or is to be otherwise physically treated prior to injection into the formation, the sample should be that of the water after such treatment. Similarly, if the water is to be chemically treated as, for example, to remove oxygen, the sample should be that after the chemical treatment.

Hydrocarbons that may be sulfonated to provide a satisfactory surfactant for use in waterflooding are commonly mixtures of hydrocarbons having a range of molecular weights. The mixture itself will have an average molecular weight. These hydrocarbons are usually alkaryl hydrocarbons. A particular type of hydrocarbon sulfonate is a petroleum sulfonate. The petroleum sulfonates may be natural petroleum sulfonates or synthetic petroleum sulfonates. Natural petroleum sulfonates are prepared by sulfonating fractions from a crude oil or refinery stream. Synethetic petroleum sulfonates are prepared by sulfonating alkyl aryl fractions synthesized in various chemical operations, including petrochemical operations, such as the alkylation of benzene with propylene tetramer. The sulfonation reaction is essentially the same whether natural petroleum sulfonates or synthetic petroleum sulfonates are to be prepared. The sulfonation may be carried out employing concentrated sulfuric acid, oleum, sulfur trioxide, or chlorosulfonic acid. Reference for procedures for the production of petroleum sulfonates is made to the Encyclopedia of Chemical Technology, Kirk-Othmer, edited by Raymond E. Kirk and Donald F. Othmer, the Interscience Encyclopedia Inc., New York, 1954, vol. 13, pages 327–331, specifically pages 330–331.

The sulfonation reaction is essentially the substitution of a hydrogen (H) atom on the hydrocarbon molecule by a sulfonic acid (—$SO_3H$) group. More than one hydrogen atom on a hydrocarbon molecule may be substituted by a sulfonic acid group. Further, not every hydrocarbon molecule in a batch of hydrocarbon molecules subjected to the sulfonation reaction may have a hydrogen atom substituted by a sulfonic acid group. The degree of substitution is the extent to which, on the average, the hydrocarbon molecules have had a hydrogen atom substituted by a sulfonic acid group. Thus, with a degree of substitution of 1, each hydrocarbon molecule, on the average, has had one hydrogen atom substituted by a sulfonic acid group. With a degree of substitution of 0.5, only one-half of the hydrocarbon molecules have had a hydrogen atom substituted by a sulfonic acid group. With a degree of substitution of 2, each hydrocarbon molecule, on the average, has had two hydrogen atoms substituted by a sulfonic acid group.

The hydrocarbons from which hydrocarbon sulfonates are commonly employed, as previously indicated, are mixtures of hydrocarbons having different molecular weights. The molecular weights may vary over a considerable range. Commonly, as previously stated, the hydrocarbon mixtures employed for preparing hydrocarbon sulfonates are characterized by the average molecular weight of their aromatic fraction. However, they may also be characterized by the median molecular weight of their aromatic fraction. Where there is a choice between several available hydrocarbons, it is preferred to employ one whose avearge molecular weight of the aromatic fraction is between about 290 and 350.

The hydrocarbon sulfonates may be employed in the acid form or in the form of a salt. The acid form is corrosive. Accordingly, the hydrocarbon sulfonates generally will be employed in the form of a neutral salt. Ordinarily, they will be employed in the form of the sodium salt. However, they may be employed in the form of a salt other than the sodium salt.

For carrying out the step of determining the degree of sulfonation of the available hydrocarbon effecting the minimum interfacial tension, portions of the available hydrocarbon are each subjected to different conditions of sulfonation to provide a series of hydrocarbon sulfonates having different degrees of sulfonation. The degree of sulfonation of each of the hydrocarbon sulfonates thus obtained may be determined by conventional procedures, such as by titration. The hydrocarbon sulfonates thus prepared are each mixed with samples of the available water to form a series of surfactant solutions, each of the surfactant solutions containing the same amount of the hydrocarbon sulfonates. By "the same amount" is meant the same molar concentration of the hydrocarbon surfactant. The amounts employed in the solutions, further, should preferably be the amounts that will yield the minimum interfacial tension between the aqueous surfactant and oil phases for the given degree of sulfonation being tested. Hence it may be necessary, in some cases, to run a series of different sulfonate concentration samples for each degree of sulfonation being tested. The solutions are then each placed in contact with the oil taken from the subterranean formation and the interfacial tension between the aqueous solutions and the oil measured.

The interfacial tension can be measured by employing a sessile drop of the surfactant solution in the oil where the oil transmits light. Alternatively, a sessile drop of the oil may be employed in the surfactant solution to measure the interfacial tension. The method of measuring interfacial tension by these procedures has been described in published references and it is not believed necessary to describe the details here. As the lower interfacial tensions are achieved, it frequently is necessary to employ a magnifying instrument, such as a microscope lens, to obtain accurate measurements of the dimensions of the drop. Other methods of measuring the interfacial tension may be employed.

The measurement of interfacial tension in at least three solutions will be required to determine the degree of sulfonation required to effect the minimum interfacial tension. However, measurement in more than three will provide a more accurate determination. Particularly, where the differences in the degree of sulfonation are small and the refinement of the data obtained is thereby improved, it may be desirable and necessary to make a greater number of measurements in order to bracket the optimum degree of sulfonation.

Having determined the degree of sulfonation of the hydrocarbon effecting the lowest interfacial tension between the oil and the water into which it will be in contact, hydrocarbon sulfonate having this degree of sulfonation is prepared. The entire amount of the hydrocarbon sulfonate adequate for completion of the contemplated waterflooding operation may be prepared at one time. However, where the waterflooding operation will extend over a period of time, only a portion of the hydrocarbon sulfonate need be prepared at one time. This portion should be sufficient to carry out the operation through at least its early stages. Thereafter, other portions of the hydrocarbon sulfonate can be prepared as the operation is carried on and the need for other amounts of the hydrocarbon sulfonate arises. On the other hand, where the availability of the hydrocarbon from which the hydrocarbon sulfonate is prepared may not continue, it is advisable to prepare initially the entire amount of the hydrocarbon sulfonate required.

The prepared hydrocarbon sulfonate is employed to prepare flooding water for injection into the subterranean formation. The amounts employed, i.e., the concentration of the hydrocarbon sulfonate in the flooding water, may be the amounts conventionally employed. For example, the concentration may be at least 0.01 and no more than 25 weight percent of the water. Further, the amounts of the flooding water containing the hydrocarbon sulfonate injected into the formation may be those conventionally employed. For example, the flooding water containing the hydrocarbon sulfonate may be injected into the formation in the amount of 0.05 to 0.6 pore volume of the formation swept by the flooding operation. Greater amounts may be employed but greater amounts entail greater costs and the additional oil recovered by such greater amounts may not be commensurate with the cost of the greater amounts of the flooding water. The total amount of the flooding water containing the hydrocarbon sulfonate may be injected into the formation as a single slug or as a plurality of slugs. Where the flooding water containing the hydrocarbon sulfonate is injected into the formation in a plurality of slugs, a driving fluid is injected into the formation between the slugs to drive the slugs through the formation to the production well or wells. Further, following injection of the total amount of the flooding water containing the hydrocarbon sulfonate, a driving fluid is injected into the formation similarly to drive the solution through the formation to the production well or wells. The driving fluid may be natural gas, exhaust gas, water, or other suitable driving fluid conventionally employed in flooding operations. Preferably, water is employed as the driving fluid.

Where the formation contains brine having a different ionic strength, or a different salt composition than the water employed for preparing the solution of the hydrocarbon sulfonate, it is preferred to inject a slug of the water employed for preparing the solution prior to the solution. In this way, the brine in the formation is displaced from the formation by the slug of water and provides a buffer zone between the brine in the formation and the flooding water containing the hydrocarbon sulfonate to prevent contact of the brine and the flooding water.

Similarly, where water is employed as the driving fluid and the driving fluid, for some reason or other, is not the same water as that employed for preparing the flooding water containing the hydrocarbon sulfonate, a slug of the water employed for preparing the flooding water is injected into the formation between the flooding water and the driving fluid to provide a buffer zone, preventing contact of the flooding water with the driving water.

If desired, various types of agents may be added to the flooding water containing the hydrocarbon sulfonate to impart additional properties to the flooding water or enhance the properties of the flooding water. Thus, a thickening agent may be added within limits to the flooding water where viscosity is required. A preservative may be used in addition to the thickening agent where the thickening agent requires a preservative. Further, agents to reduce adsorption of the hydrocarbon sulfonate on the surfaces of the formation may be employed in the flooding water.

What is claimed is:

1. In a process for recovering oil from a subterranean formation wherein a sulfonate of an available hydrocarbon is dissolved as a surfactant in available water containing sodium chloride to form flooding water, said flooding water is injected into said formation through an injection well leading thereto, and said oil is displaced within said formation in the direction of a production well leading therefrom whereby said oil may be recovered from said production well, the improvement comprising:
   (a) placing oil taken from said subterranean formation in contact with a plurality of solutions prepared from said available water containing sodium chloride, each of said solutions containing a sulfonate of said available hydrocarbon and each of said sulfonates having a different degree of sulfonation,
   (b) measuring the interfacial tension for each of said solutions between said oil and said solution,
   (c) preparing flooding water from said available water containing a sulfonate of said available hydrocarbon having a degree of sulfonation which will provide the lowest interfacial tension between said flooding water and said oil in said subterranean formation as determined in step (b), and
   (d) injecting said flooding water into said subterranean formation.

2. The process of claim 1 wherein said available hydrocarbon is a mixture of hydrocarbons.

3. The process of claim 2 wherein the average molecular weight of the aromatic fraction of said mixture of hydrocarbons is between about 290 and 350.

4. The process of claim 1 wherein said available water contains not more than 5 percent by weight of sodium chloride.

5. The process of claim 1 wherein a slug of said available water is injected into said formation prior to said flooding water.

6. The process of claim 1 wherein a driving fluid is injected into said formation after said flooding water.

7. The process of claim 6 wherein said driving fluid is said available water.

8. The process of claim 1 wherein each of said solutions containing a sulfonate of said available hydrocarbon contains the same amount of said sulfonate.

9. The process of claim 1 wherein said sulfonate of said available hyrocarbon is a petroleum sulfonate.

References Cited
UNITED STATES PATENTS

| | | | |
|---|---|---|---|
| 2,808,109 | 10/1957 | Kirk | 252—8.55 |
| 2,839,466 | 6/1958 | Shock et al. | 166—275 |
| 3,126,952 | 3/1964 | Jones | 166—274 |
| 3,167,119 | 1/1965 | Meadors | 166—274 |
| 3,187,564 | 6/1965 | Dodd | 166—252 X |
| 3,288,213 | 11/1966 | King et al. | 166—274 |
| 3,302,711 | 2/1967 | Dilgren | 166—270 |
| 3,302,713 | 2/1967 | Ahearn et al. | 166—274 |
| 3,330,344 | 7/1967 | Reisberg | 166—275 X |
| 3,348,611 | 10/1967 | Reisberg | 166—275 |
| 3,392,782 | 7/1968 | Ferrell et al. | 166—275 |

STEPHEN J. NOVOSAD, Primary Examiner

U.S. Cl. X.R.

166—274, 275